United States Patent
Dowell et al.

(10) Patent No.: US 10,610,795 B2
(45) Date of Patent: Apr. 7, 2020

(54) METHOD AND APPARATUS FOR A SENSORY FLOOR

(71) Applicants: Winship Dowell, Jacksonville, FL (US); Jesse Whitaker McRae, Tampa, FL (US)

(72) Inventors: Winship Dowell, Jacksonville, FL (US); Jesse Whitaker McRae, Tampa, FL (US)

(73) Assignee: Emotions Platform, LLC, Jacksonville, FL (US)

( * ) Notice: Subject to any disclaimer, the term of this patent is extended or adjusted under 35 U.S.C. 154(b) by 0 days.

(21) Appl. No.: 16/054,255

(22) Filed: Aug. 3, 2018

(65) Prior Publication Data
US 2019/0038981 A1   Feb. 7, 2019

Related U.S. Application Data

(60) Provisional application No. 62/541,131, filed on Aug. 4, 2017.

(51) Int. Cl.
| | |
|---|---|
| A63G 31/14 | (2006.01) |
| B06B 1/04 | (2006.01) |
| B06B 1/00 | (2006.01) |
| A63J 17/00 | (2006.01) |
| A63J 99/00 | (2009.01) |
| H02N 2/00 | (2006.01) |
| F21V 23/04 | (2006.01) |

(52) U.S. Cl.
CPC .............. *A63G 31/14* (2013.01); *A63J 17/00* (2013.01); *A63J 99/00* (2013.01); *B06B 1/00* (2013.01); *B06B 1/045* (2013.01); *F21V 23/0407* (2013.01); *H02N 2/001* (2013.01)

(58) Field of Classification Search
CPC ......... A63F 13/285; G06F 3/016; G08B 6/00; F21V 33/00
See application file for complete search history.

(56) References Cited

U.S. PATENT DOCUMENTS 5,442,710 A * 8/1995 Komatsu ............... A61H 1/005
  381/162
8,283,794 B2 * 10/2012 Brezet ..................... F03G 5/06
  290/1 R (Continued)

FOREIGN PATENT DOCUMENTS

GB      1447588 A * 8/1976  ............. H04R 9/066

OTHER PUBLICATIONS

Clark Synthesis, Clark Synthesis Tactile Sound Installation Guide, Nov. 2009, www.clarksynthesis.com, pp. 1-20. (Year: 2009).*

*Primary Examiner* — Fan S Tsang
*Assistant Examiner* — Angelica M McKinney
(74) *Attorney, Agent, or Firm* — Joseph P. Kincart; Rogers Towers, P.A.

(57) ABSTRACT

The present invention provides an active sensory floor that provides sensations to non-auditory senses of persons at an event via one or both of movement and vibrations of the sensory floor. Sensory output of the floor may be controlled via a mixer or other controller during a performance, pre-recorded or provided based upon an input, such as music playing. Additional sensory stimulation, such as, for example, visual stimulation may also be synchronized with non-auditory stimulation.

20 Claims, 3 Drawing Sheets

(56) References Cited

U.S. PATENT DOCUMENTS

| | | | |
|---|---|---|---|
| 10,310,610 B2 * | 6/2019 | Krogstad | G06F 3/011 |
| 2003/0033600 A1 * | 2/2003 | Cliff | A61B 5/162 |
| | | | 725/12 |
| 2004/0160336 A1 * | 8/2004 | Hoch | G06F 3/011 |
| | | | 340/4.31 |
| 2009/0007458 A1 * | 1/2009 | Seiler | A43B 3/00 |
| | | | 36/136 |
| 2009/0010468 A1 * | 1/2009 | Oser | H04R 5/023 |
| | | | 381/332 |
| 2010/0308982 A1 * | 12/2010 | Cooperstock | G06F 3/011 |
| | | | 340/407.1 |
| 2014/0085873 A1 * | 3/2014 | Willis | F21V 17/101 |
| | | | 362/145 |
| 2017/0227210 A1 * | 8/2017 | Cordes | F21V 33/00 |
| 2018/0126263 A1 * | 5/2018 | Seiler | G09B 5/06 |

* cited by examiner

METHOD AND APPARATUS FOR A SENSORY FLOOR

FIELD OF THE DISCLOSURE

The present disclosure relates to methods and apparatus to provide an active sensory floor that provides at least a sensation of movement or vibrations to persons on the sensory floor.

BACKGROUND OF THE DISCLOSURE

The entertainment business provides sensory experiences for people in increasingly stimulating ways. Humans ordinarily can hear acoustic signal in an audible range of about 20 Hz to about 20 kHz. A human entertainment experience typically includes these frequencies. Often the entertainment experience will combine audible frequencies with other stimulation, such as a visual experience via lighting, fog and mists, such as via dry ice, and pyrotechnics. However, there is an ongoing effort to provide further stimulation via additional sensory input.

What is needed is a way to stimulate a person's non-auditory senses to perceive a musical performance more immersively.

SUMMARY OF THE DISCLOSURE

The present invention provides for a sensory floor that may be controlled to provide non-auditory stimulation to persons on the sensory floor. In some embodiments, the sensory floor includes a dance floor or viewing floor that is controlled in a manner synchronized with a musical performance.

Some embodiments of the present invention are based upon the concept that humans may perceive sensory floor signals by non-auditory senses, e.g., as an acoustically-generated vibration or a pulsating signal upon or through parts of the body. Apparatus of the present invention provide acoustically-generated vibrations which may be perceived at frequencies from below the audible lower limit (i.e., lower than 20 Hz) to an upper limit within the audible range. For example, the acoustically-generated vibrations may be perceived by direct contact with a vibrating object, or by a force of sensory floor signals impinging on a major body part such as the chest, or as a resonance in the lungs and windpipe, or other area of the body that may be stimulated by a transducer.

In one example, a sensory floor signal may be an electrically-amplified signal generated during a musical performance, and acoustically-generated vibrations may include vibrations of the floor that can be felt by persons standing on the floor. These sensory floor signals may include a pulsing signal that represents a drumbeat or similar pattern, or all sound vibrations in a given frequency range of a specific audio stream. For example, for illustrative purposes not meant to limit the scope of the invention, an audio stream comprising a drumbeat may be replicated by a transducer to vibration be perceptible by a non auditory body part at a rate of about 1 Hz, with each drumbeat lasting about 0.1 seconds, and within each drumbeat an acoustic and/or non-auditory signal may be perceived at a rate of about 30 Hz. Other correlations of audio streams transduced to vibrations perceptible by a body part are also within the scope of the present invention.

In another aspect, a vibrating floor, may be vibrationally isolated from the rest of the building, in order to avoid stress damage in the building, or may be objectionable to persons in other rooms or on other floors, etc. Accordingly, some implementations may include use of a sensory floor in correlation with a building that includes damping features that intentionally absorb or reduce vibrations. Furthermore, the need for such a floor may be temporary, such as to support a one-time event such as a wedding reception.

The ability to experience sensory floor signals by non-auditory senses may enhance enjoyment of a musical performance both live and recorded. For example, stimulating non-auditory senses enhances an immersive perception of a musical performance, or enhances a desire to participate in an activity related to the musical performance, e.g., dancing. It is also within the scope if this invention to provide stimulation of non-auditory senses in an organized and/or scripted manner that is not based upon synchronization to music. Similarly, in some embodiments, a script and/or organization may be synchronized to a piece of music, but not generated via a derivation of the music piece. Alternatively, some embodiments include stimulation of non-auditory senses based upon a derivation of a music piece and synchronization with the music piece.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure, in which.

Figure 1:
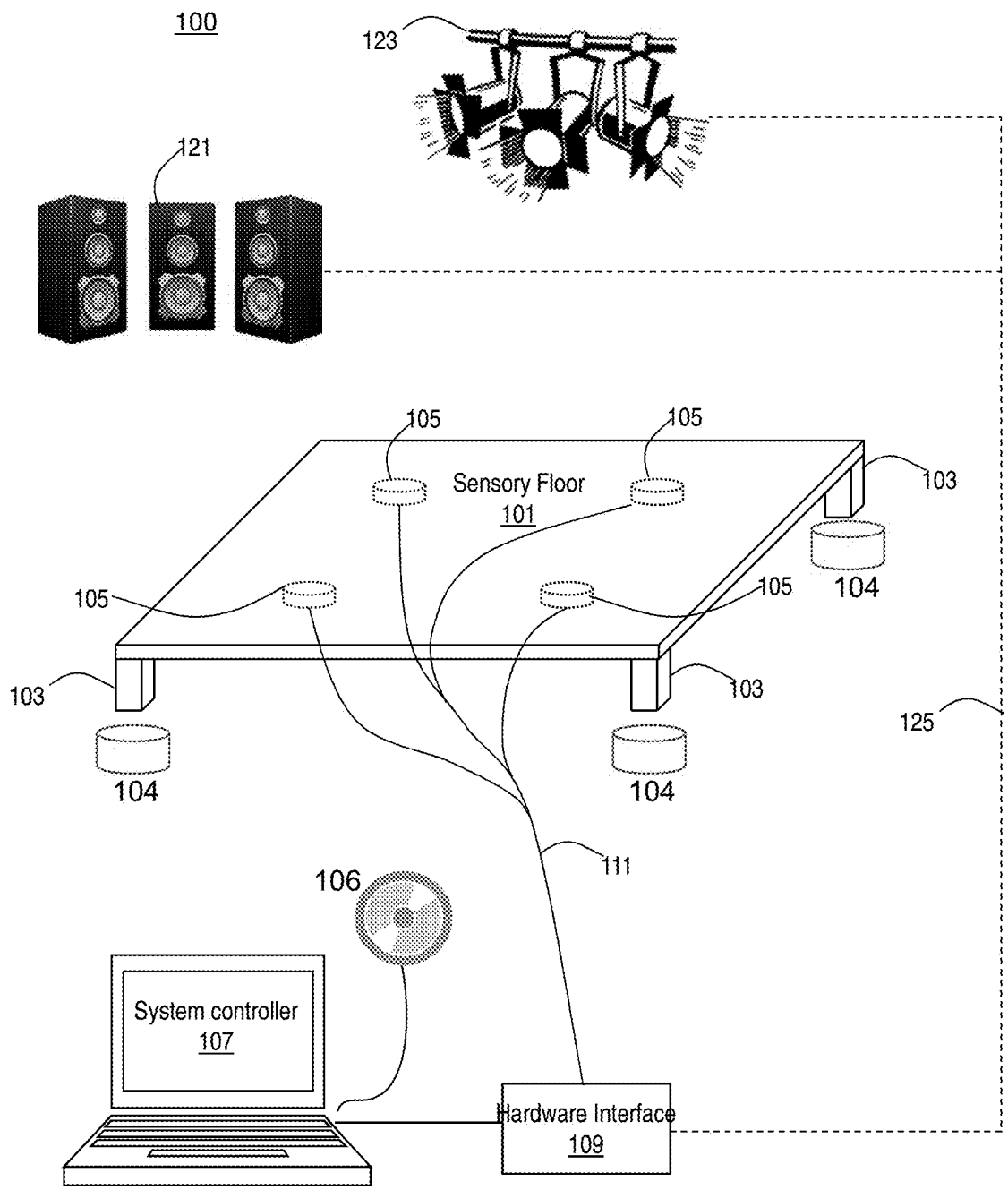
FIG. 1 illustrates a functional block diagram to provide a sensory floor with hardwired connections, in accordance with an embodiment of the present invention.

The drawings are not necessarily drawn to scale unless clearly indicated otherwise.

DETAILED DESCRIPTION

In the following sections, detailed descriptions of examples and methods of the disclosure will be given. The description of both preferred and alternative examples though through are exemplary only, and it is understood to those skilled in the art that variations, modifications, and alterations may be apparent. It is therefore to be understood the examples do not limit the broadness of the aspects of the underlying disclosure as defined by the claims.

Embodiments in accordance with the present disclosure provide a sensory floor (e.g., a sensory dance floor) capable of stimulating non-auditory sensory perception to a person. The sensory floor may be used in conjunction with music provided by a disc jockey at a public or private event, at a musical performance (e.g., a concert), a show (e.g., a Broadway show; a movie theater; an amusement park performance), a festival, or the like. The sensory floor may be placed underneath at least a portion of the audience. For example, the sensory floor may be provided as a dance floor at a venue such as a concert, a social event, a nightclub, a wedding reception, and so forth. In another example, the sensory floor may be used to provide non-auditory stimulus to a seated audience such as at a show. The sensory floor may be synchronized with a performance, such as a musical performance at a concert (e.g., coinciding with a drumbeat), or a dramatic performance such as special effects at a show (e.g., to provide a non-auditory stimulus of an earthquake at an earthquake-related movie), and so forth.

A musical performance synchronized with a sensory floor may be live or recorded. Recorded performances may include combinations of: audio; visual and olfactory stimulations. In some embodiments, a separate file may control floor sensory activation and be stored as their own copyrighted tracks. For example, a sensory floor track may be coordinated with a musical track, or played independently.

In some embodiments, an industrial grade vibrator apparatus may be attached to the bottom of a wood or plastic floor that a crowd will stand upon. The vibrator should be sufficiently sized to accommodate at least the maximum expected crowd density, e.g., one person per square foot, or about 250 pounds per square foot. A safety margin may be added, requiring a total vibrator capability of, e.g., at least about 500 pounds per square foot. The flooring may be sufficiently flexible to allow a rolling wave pattern (e.g., a 1 Hz wave synchronized with a drumbeat), without feeling excessively bouncy or deformable to a human (e.g., a vertical deformation of no more than 0.5 inches when stood upon by one person). Examples of industrial grade vibrators may include, by way of non-limiting example: Air Piston Vibrators, Pneumatic Vibrators, Pneumatic Turbine Vibrators, Rotary Electric Vibrators, Electromagnetic Vibrators, Pneumatic Ball Vibrators and Pneumatic Foundry Vibrators.

Embodiments may use a processor controlled by a control program stored in a memory coupled to the processor. The control program may cause the processor to send activation commands to a vibration actuator, which in turn creates vibrations or other non-auditory stimulus through a sensory floor coupled to the vibrators, and to/through persons standing or sitting on the sensory floor, in order to create a desired physical sensation (e.g., a wave-like feeling, or other pattern of non-auditory stimulus).

Embodiments may be configured to have one or more sensory motion apparatus, such as, for example: vibrators, actuators, or transducers placed at a spacing of between about side by side to multiple feet apart. It is axiomatic that an area of sensory motion is subject to physical variables involved in the transmission of the sensory motion. Variables may include one or more of: a power of a force created by a sensory motion apparatus, frequency of the force created by a sensory motion apparatus and a medium for conducting a force created by created by a sensory motion apparatus. The processor may control when the vibrators cycle on and off, thus affecting the non-auditory stimulus produced by the vibrations. Embodiments may be used to mimic a feeling of bass from speakers. Often at a concert, people may try to be physically near a stage in order to feel the vibrations from the bass and speakers for a better (e.g., a more immersive) experience. Embodiments help make possible for persons to stand farther away from the speakers, but still on a sensory floor, and thus be able to experience vibrations from the vibrators beneath the sensory floor. This allows more persons to share the experience, and fewer persons to be exposed to potentially harmful levels of music from standing too close to speakers.

FIG. 1 illustrates a functional block diagram of system 100 in accordance with an embodiment of the present invention. System 100 includes sensory floor 101 elevated above a support floor (not illustrated) by legs 103. Typically, the support floor is part of a venue (e.g., a building) in which system 101 is being used. Legs 103 may include vibrational damping to at least partially isolate sensory floor 101 from the support floor. In some embodiments, vibration isolators 104 may be used to isolate a building or other structure from vibration emanating from the sensory floor.

Sensory floor 101 includes at least one, and typically a plurality of, vibration actuators 105, shown in phantom in FIG. 1. Vibration actuators 105 may be coupled to a sensory floor 101 placing the vibration actuators 105 in mechanical communication with the sensory floor 101. In some embodiments, the vibration actuators 105 are coupled to a bottom, or lower surface of a sensory floor 101 or similar raised deck area. Vibration actuators 105 may be, for example, an unbalanced or uncentered rotating device, a reciprocating device, an oscillating magnetic device, an audio transducers synthetic muscle (i.e., a device made from a material that physically contracts when an electrical voltage is applied), and so forth.

In preferred embodiments, vibration actuators operate at a sound level that is not excessively noisy, but may generate a moderate amount of noise if the generated noise would be expected to be masked by the sound of the performance. Accordingly, generated by a vibration sensor if preferably below that of normal human conversation, such as, by way of example, below 80 decibels.

Vibration actuators 105 may be sized to produce a human-perceptible vibration on sensory floor 101 when burdened by up to about 250 to 500 pounds per square foot of weight.

In some embodiments, vibration actuators 105 may be coupled to the support floor (e.g., by resting on, or being bolted to, the support floor). Being coupled to the support floor may allow vibration actuators 105 to produce more forceful vibrations. However, such embodiments may take longer to install (e.g., for bolting or alignments), and may also introduce a higher level of undesirable vibration to the support floor.

In other embodiments, vibration actuators 105 may be coupled only to the bottom major surface of sensory floor 101. Such an embodiment is more effective in isolating the support floor from unwanted vibrations. However, the vibrations produced by vibration actuators 105 may not be as forceful compared to being coupled to the support floor.

According to the present invention, vibration actuators 105 are responsive to control signals to generate stimulation of non-auditory senses of a person in proximity to the vibration actuators 105, such as a person standing on a sensory floor in mechanical communication with the vibration actuators 105. As used herein, a non-auditory sense includes human sensory perception other than those perceived by the auditory sense organ, e.g. the cochlea, organ of corti, tectorial membrane, basilar membrane and auditory sensory cells.

Preferred embodiments include a control signal operative to cause the vibration actuators 105 to generate motion. The control signal may be synchronized, or otherwise coordinated with an audio stream received from an audio source 106. The audio source may be any device capable of generating an audio signal which may be a prerecorded signal or live audio.

System 100 further includes a system controller 107 (e.g., a computer that includes a processor coupled to a memory) the memory configured to store instructions that, when executed by the processor, causes system controller 107 and system 100 to perform embodiments described here. System controller 107 may contain a software program to run sensory sequences and effects that a system operator (generically, a "disc jockey" or "DJ") would like the crowd to feel. System controller 107 may be coupled to a hardware interface 109, either internally or externally to system controller

107, by way of, e.g., a serial port (e.g., USB), a SCSI interface, an Ethernet interface, a PCI data bus, and so forth.

Hardware interface 109 in turn may be coupled to at least one vibration actuator 105 by use of communication interface 111. Communication interface 111 at a physical layer may be a wired or wireless interface (e.g., a wired link like USB or an RF link such as WiFi, Bluetooth® or near field communications (NFC)). In some embodiments, hardware interface 109 at a physical layer may be communicatively coupled directly to each vibration actuator 105. In other embodiments, hardware interface 109 at a physical layer may be communicatively coupled to vibration actuators 105 by way of a daisy chain type of connectivity, or other hardwired or wireless connection (including, but not limited to a wireless mesh). At a protocol layer, hardware interface 109 may be coupled to vibration actuators 105 by a protocol such as TCP/IP, Digital Multiplex (DMX), and so forth. In some embodiments, a protocol such as DMX may be advantageous if it is being used to control other elements of stagecraft during a performance, by reducing a number of disparate controllers or protocols that need to be supported.

In some embodiments, hardware interface 109 may be coupled to and control additional elements of a musical venue, such as speakers 121 and controllable spotlights 123. This coupling may be optional, as indicated by the dashed signal line(s) 125. These additional elements may interface with system 100, but are not necessarily part of system 100.

In some embodiments of system 100, or of using system 100, a DJ may control a dance floor and environment, the environment including a sensory floor such as illustrated in FIG. 1. The DJ may use a system controller (e.g., a mixing board or a software equivalent running on system controller 107). The system controller may be capable of creating a plurality of patterns of non-auditory sensory stimulation, e.g., by segmented areas of the dance floor (or area where an audience primarily may just listen to or watch a performance). For example, the segmented areas may take on shapes of a grid, concentric circles, arcuate-shaped or wedge-shaped segments (i.e., pie shapes), and so forth.

Each of the segmented areas may be controlled by the DJ for an amount of time and for a type of enhanced sensory stimulation (including non-auditory stimulus). For example, the enhanced sensory stimulation may include one or more of vibration, bass or drumbeats from music, visual (e.g., light colors, intensity, direction of projection, movement, strobing, etc.), simulation of certain instruments, and so forth.

Control of system 100 may be by one or more of a variety of physical and/or protocol interface methods. For example, the physical interface may include one of a wireless technology such as near field communications (NFC), Bluetooth®, ZigBee (IEEE 802.15.4), ANT+, infrared, and so forth. Alternatively or in addition, the physical interface may include a wired interface.

System 100 may be controlled in order to synchronize light and vibration either to each other or to music. For example, a musical track with a strong audible drumbeat may be accompanied by lights that flash with each drumbeat, and/or a pulsed vibration signal that coincides with each drumbeat.

In some embodiments of system 100, or of using system 100, lights (e.g., spotlights 123) may include respective light emitting diode (LED) arrays. Usage of LED arrays provides flexibility and controllability of lighting aspects, such as, one or more of: which LEDs are caused to emit light, color of light emitted, intensity of light emitted; direction of projection of light emitted; time-based effects of light, such as fades and pulsations; patterns of light emitted; and control of other variable related to the emitted light. In some embodiments, lights 123 may be embedded into sensory floor 101. Some preferred embodiments include upward facing lights embedded in the sensory floor. The upward facing lights may be controlled according to variables under consideration. Variables may include an audio stream, a desired psychological effect, a number of people on the sensory floor, a density of people on the sensory floor, a degree of movement of people on the sensory floor, a volume of an audio stream being played, a type of audio stream being played (e.g. vocal, rock music, rap music, classical music).

In another aspect, in some embodiments, lighting effects from lights 123 may be synchronized with music from speakers 121 (e.g., correlated to a characteristic of the music, such as frequency, octave, tempo, etc.), and/or synchronized with vibrations caused by vibration actuators 105.

In another aspect, in some embodiments of system 100, or of using system 100, a projected audio stream (e.g., sound from speakers 121) may include venue appropriate sound generation devices (e.g. speakers 121 capable of filling a venue space or individual headphones). Usage of venue appropriate sound generation devices provides flexibility and controllability of audio aspects, such as, one or more of: which speakers are caused to emit sound, frequency mix of audio emitted, intensity of audio emitted; direction of projection of audio emitted; time-based effects of audio, such as fades and pulsations; patterns of audio emitted; and control of other variable related to the emitted audio. In some embodiments, speakers 121 may be embedded into sensory floor 101. Some preferred embodiments include upward facing speakers embedded in the sensory floor, although some bas speakers may be directed into a floor surface. Variables may include an audio stream, a desired psychological effect, a number of people on the sensory floor, a density of people on the sensory floor, a degree of movement of people on the sensory floor, a volume of an audio stream being played, a type of audio stream being played (e.g. vocal, rock music, rap music, classical music).

In some embodiments, customers (e.g., dancers or listeners of the music) may wear a controllable device issued to the customers upon entering a venue. The controllable device may provide a controllable output (e.g., a visible light) that may be synchronized with a musical performance by system controller 107. Control of the wearable devices may be by way of WiFi or other RF signals. Relatively precise location of the wearable device within the venue may be accomplished by monitoring a beacon signal transmitted by or received by the wearable device by using a global positioning system (GPS) transceiver on the device, or use of other location determining apparatus and systems, such as systems based upon triangulation. The controllable device may be controlled by system controller 107.

In other embodiments, the wearable device may monitor a parameter of the person wearing the device (e.g., a heartbeat of the wearer of the device, another physiological parameter of the wearer such as skin temperature, sweat level or skin resistivity, a level of motion of the wearer, and so forth). The monitored parameter then may be transmitted back to system controller 107 and optionally to the DJ, in order to gauge an effect the music is having upon the wearer. A condition or emotion of the wearer such as a level of excitement may be inferred from the monitored parameters. Respective conditions of a group of some or all of the wearers (e.g., portions of an audience) may be inferred from respective monitored parameters. Conditions of groups may be determined for different sections of an audience, e.g., men versus women, left side versus right side, etc.

In some embodiments, the wearable device may be paired with another device (e.g., a smart phone such as an iPhone® or Android™ compatible device), in order to access capabilities of the smart phone such as an accelerometer, microphone, other sensor, or transmitter. The wearable device also may pair with another wearable device of the same or different kind (e.g., a FitBit™ or smartwatch) in order to exchange data.

The wearable device may be provided in any of a variety of types or configurations of wearable devices. For example, the wearable device may be provided as a wrist band, pendant, necklace, lanyard, lapel pin, belt clip, etc. The wearable device may be provided at an entrance of a venue, and may act as an ID for admittance to a dance floor equipped with embodiments in accordance with the present disclosure. The wearable device may monitor wearer activity and transmit a record of the activity, e.g., dancing, clapping, hand waving, foot stomping, etc.

Some embodiments may infer a condition or status of a crowd as a whole (e.g., an average condition or status of individual members of the crowd) by monitoring or measuring a condition of the entire crowd. For example, a sensor may measure an infrared level or signature of bodies on a dance floor, in order to determine an amount of body heat (indicative of a high level of activity), number of bodies per square foot, a kinetic level of body movement, and so forth.

In some embodiments, a screen display may be provided in order to display to dancers one or more dance floor activities, e.g., for synchronized dancing, copying well-known choreography (e.g., Michael Jackson's Thriller, Beyoncé videos), line dancing, etc.

In some embodiments, other senses may be stimulated. For example, an olfactory dispenser may release predetermined odors at various points in a performance. In another example, a mist may be released, the mist providing one or more qualities such as a fragrance, a moisture content in ambient air, a cooling sensation, a visible fog, and so forth. In some embodiments, air motion such as a breeze or wind may be provided to accentuate a portion of a performance. For example, a soft breeze may accompany a soft voice or an emotional performance, etc. Conversely, a harder wind may accompany a more rousing performance such as a heavy metal performance.

In other embodiments, other physical effects may be achieved by release of dry ice, particulates (e.g., grit or dust), and so forth.

In some embodiments, holographics may be used, and controlled from a DJ booth. Images may be projected from underneath a sensory floor via translucent areas the sensory floor. In other embodiments, holographics may be formed or projected among persons on the sensory floor, or to the side of, or above, the sensory floor.

In some embodiments, the sensory floor and the sensory effects it produces may be synchronized with the wireless transmission of music signals to headphones worn by persons on the sensory floor. The wireless transmission to the headphones typically is by usage of RF or other electromagnetic waves, but does not include usage of audio waves (i.e., sound waves). A person without headphones would not perceive the music signals. In other embodiments, persons on the sensory floor may wear virtual reality goggles or headsets, which may provide an immersive audible and visual experience synchronized with the music signals or other audio/visual performance. In some embodiments, the headphones, headsets, goggles or the like may include sensory devices (e.g., motion detectors, accelerometers, etc.) which may provide to a DJ a feedback, indication, or the like related to crowd activity. The feedback of crowd activity may be, e.g., a measure of motion, which likely would be positively correlated with enjoyment of the musical performance by members of the crowd.

In some embodiments, a smart mixer board may be used by a DJ. The smart mixer board may be able to accept as inputs a characterization of the music being played (e.g., type, tempo, volume, etc.), a characterization of the crowd (e.g., feedback as gathered from sensors, such as crowd motion, physiological measurements, etc.), and then use artificial intelligence (AI) or machine learning (ML) techniques to suggest to the DJ additional music or other sensory effects to be played that would be well-received by the crowd, or to change crowd mood to a desired state (e.g., to excite a crowd at the beginning or climax of a performance, to wind down a crowd toward an end of a performance, to induce the crowd to perform an activity jointly such as singing or movement or gestures, etc.).

Figure 1A:
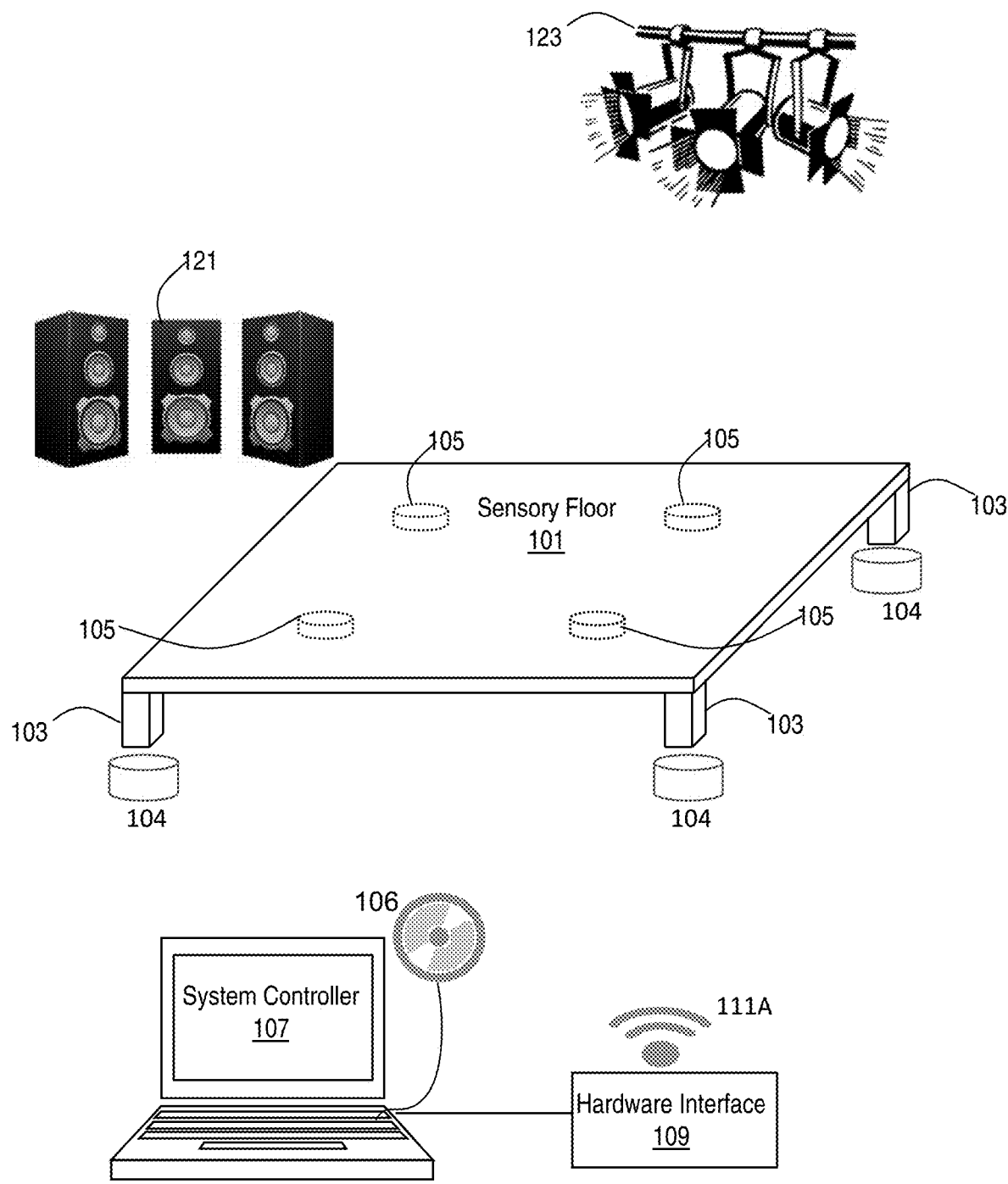
FIG. 1A illustrates a functional block diagram to provide a sensory floor with wireless transmissions, in accordance with an embodiment of the present invention.

Referring now to FIG. 1A, in some embodiments, wireless transmission of data may be used to transmit audio and control signals to various components (101, 103, 105, and 121) of the sensory floor system.

Figure 2:
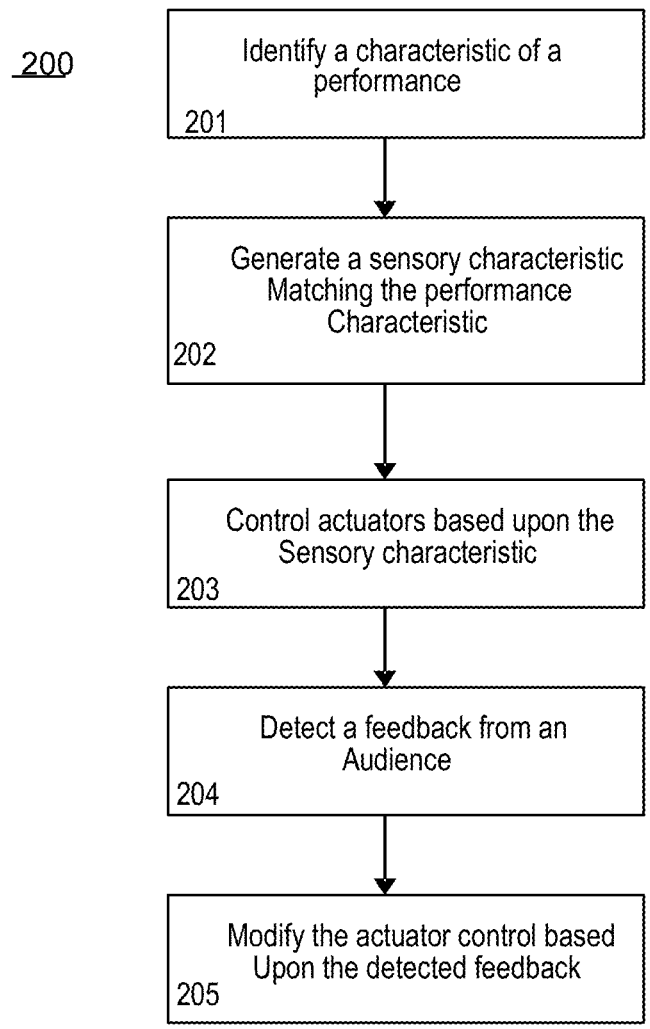
FIG. 2 illustrates a method for controlling actuators based upon a sensory characteristic, in accordance with an embodiment of the present invention.

FIG. 2 illustrates a process 200 in accordance with some embodiments of the present invention. While method steps have been depicted in the drawings in a particular order, this should not be understood as requiring that such operations be performed in the particular order shown or in a sequential order, or that all illustrated operations be performed, to achieve desirable results. As illustrated, process 200 begins at step 201, at which a characteristic of a performance is identified. For example, the characteristic may include technical parameters (e.g., loudness, tempo, types of musical instruments being used, presence or absence of vocals, etc.) or artistic parameters (e.g., musical genre such as hip hop, heavy metal, classical, etc.).

At step 202, a sensory characteristic is generated that matches a characteristic of the performance. For example, if a strong drumbeat characteristic is detected in the performance, then the desired sensory characteristic may be to generate a vibrational signal in a sensory floor, the vibrational signal having a predetermined frequency, magnitude and repetition rate.

At step 203, physical control signals are generated and transmitted to actuators in order to generate desired sensory characteristics from step 203.

At step 204, a feedback from an audience may be measured or otherwise assessed (e.g., qualitatively assessed) in order to compare a desired audience state (e.g., a level of involvement or excitement) to an actual or detected audience state.

At step 205, actuators may be adaptively controlled in order to try to provide an actual or detected audience state that is closer to a desired audience state.

Example 1

The following describes aspects of some exemplary embodiments of the present invention.
Terminology
API Application Program Interface
LAN Local Area Network
LED Light Emitting Diode
MPD Music Player Daemon
REST Representational State Transfer
RGB Red/Green/Blue
UI User Interface In Example 1, a Sensory dance floor is provided that allows for artists to "reach out and touch" a crowd by immersing the crowd multiple concurrent sensory perceptions. A scalable mesh of smart floor panels i utilized to deliver custom audio and lighting data upward to the crowd at a festival or venue stage of any reasonable scale.

Stage platforms are provided of a sturdy metal build, with risers generally putting them between 24" and 48" off the ground. In some embodiments, they may have a hard plastic top, and a simple 8' by 8' setup.

A network of upward facing audio transducers is installed into the staging panels to allow controllable beats and vibrations to flow upward to the audience standing above, in a much more intimate way than possible before.

Clear plastic flooring panels of industrial thickness and strength may be used. A network of upward facing RGB LED light panels are installed underneath the floor panels for controllable color to be directed towards the audience situated on top of the floor panels.

A wired connector may exist in each side of a panel, and be able to transfer (1) power, (2) audio data, and (3) lighting data. Alternatively, or in combination with wired configurations, wireless transmitters may transmit one or both of control signals and power to one or more of; lights, sound generators (speakers) and vibration actuators.

The sensory dance floor includes a fully scalable mesh network where the attachment of new nodes work seamlessly with existing nodes, receiving and passing appropriate data to all nodes on the mesh. This data not only provides for custom light data and also integrates custom sound data in a similar manner.

Product Components

The component design for sensory the exemplary dance floor will include 3 key components: (1) controller, (2) meshable smart floor panels, (3) controller UI software.

The sensory dance floor software may reside within 2 separate hardware components: a) in a server; and b) in client side components. The server transmits custom audio and light data to clients. The server and clients may be controlled from a third component, including a controller User Interface (UI). Multiple controller UIs attach to the same server for parallel control (like from a MacBook and iPad simultaneously). The nature of the mesh network allows for each single server to have a scalable array of client components.

A sensory dance floor may include one or more of: emotionshome including a Server component, hardware and software; emotionsfloor including Client components, hardware and software; and emotionsapp including controller UI component(s) and software In some embodiments, the server setup may also be run locally on the PC with the UI, rather than on emotionshome platform, however a standalone controller PC is preferred.

Two types of data may be hosted and sent throughout a mesh network: (1) audio and (2) lighting. Each of these data types may have a separate server/client solution, both maintained by the same sensory dance floor software.

The sensory dance floor software will integrate controls and push real time data through the scalable mesh hardware. The server may reside on a controller PC, while the clients may reside on each floor panel tile.

Audio Data

In order to deliver real time audio data through a scalable mesh may include: computer/tablet based UI software to control audio data; music player daemon to serve the audio data stream that the UI controls; and software to scale the MPD output to multiple clients synchronously. Clients to receive audio data and convert it to the format expected by the amps.

UI Software

UI software may include: emotionsapp, will control the user experience of sensory dance floor. It will be written to run on x86_64 platforms such as macOS, Windows, or Linux installations, as well as ARM platforms such as iOS and Android.

In some embodiments, the emotionsapp may be a native applications for the above computing platforms or a web app hosted on emotionshome. The emotionsapp will allow the special emotions platform features that manipulate the audio in custom ways, controlling the entire experience from the stage, DJ, audio booth, or wherever is most convenient for the user.

Music Player Daemon

A Music Player Daemon (MPD) may be used to serve an audio data stream that is controlled by emotionsapp. It runs on emotionshome, and is the audio client that emotionsapp will connect too directly. The MPD may be used as the backbone of the audio control that emotionsapp is built around.

For example, an open source or custom made MPD may be used, and one of the most well supported and extendable is Mopidy. Mopidy is a server application, written in Python, that can easily run on Linux and Mac computers, as well as the low cost Raspberry Pi. Mopidy has API extensions for MPD control or HTTP control, and supports an arsenal of mixer extensions for special tuning of audio stream.

Synchronized Server/Clients

The MPD may allow control of a single audio stream to individual clients, but typically does not ensure any amount of clients connect or remain synchronous to the same audio stream. Snapcast can ensure that clients connect or remain synchronous. Snapcast contains 2 parts: (1) Snapserver and (2) Snapclients.

A single Snapserver instance may run on emotionshome along with the Mopidy MPD. This Snapserver may be configured to receive the audio stream from the Mopidy MPD and serve it over LAN to Snapclients running on separate devices.

Each floor panel, emotionsfloor, may have a single Raspberry Pi controller, which may each be running a Snapclient instance. These clients may receive the audio stream sent from the Snapserver on emotionshome, which itself receives the audio stream from the Mopidy MPD (with additional audio mixing), which is controlled in full from emotionsapp.

Lighting Data

A computer/tablet based UI software to control audio data, a lighting server to output the lighting data stream that the UI controls and one or more clients to receive audio data and convert it to the format expected by the RGB fixtures may be used to deliver real time lighting data through a scalable mesh there are a few key elements needed.

Software

Lighting data may be controlled by the emotionsapp software as well as audio data. It may be integrated into the experience along with audio control.

Lighting Server/Clients

Lighting info may be served to clients using the REST API, which has recently emerged as the standard architectural design for web services and web APIs. These REST server and clients may be written in Python and using the flask package.

Initial Hardware

The hardware design for sensory dance floor may, from a developer's perspective, have 3 key components: (1) mesh control, (2) audio output, and (3) lighting output. Each of these hardware components can be developed separately and independently, as they have very well defined and commercially standardized interfaces (audio signals and RGB dimming signals, respectively).

Mesh Control

This hardware is the backbone of sensory dance floor, allowing custom data streaming that allows the receipt and output of the audio and lighting hardware locally on each floor panel. It may consist of a controller running a client software (e.g. a Raspberry Pi running Snapclient). It is also possible to run an instance of Mopidy MPD (for special per panel audio control).

Through GPIO pins aboard the Raspberry Pi it may output to an RGB LED lighting panel. The RGB LED lighting panel may have multiple independently controllable dimmers to achieve its RGB spectrum, including: (1) hot spectrum and (2) cool spectrum. Each floor panel in sensory dance floor may be controlled by a single controller device, or multiple panels may be controlled via a single controller device.

A number of embodiments of the present disclosure have been described. While this specification contains many specific implementation details, there should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results.

In certain implementations, multitasking and parallel processing may be advantageous. Nevertheless, it will be understood that various modifications may be made without departing from the spirit and scope of the claimed disclosure.

What is claimed is:

1. A method of synchronizing a musical performance with a sensory dance floor to provide non-auditory stimulation, the method comprising:
   a) placing a smart mixer board in logical communication with one or more vibration actuators in mechanical communication with multiple disparate floor panel tiles included in the sensory dance floor;
   b) operating the smart mixer board to control the vibration actuators of selected floor panel tiles comprising the multiple disparate floor tiles;
   c) receiving music in an audio stream into a vibration actuator controller;
   d) synchronizing the sensory dance floor with the audio stream by generating a vibration actuator control signal based upon an audio component of the received audio stream;
   e) transmitting the vibration actuator control signal to the one or more vibration actuators; and
   f) generating the non-auditory stimulation through the sensory dance floor via operation of the vibration actuators in response to the user viewing the crowd reaction.

2. The method of claim 1 additionally comprising the steps of:

f) placing one or more light sources in visual communication with at least a portion of sensory dance floor that is transparent to visual light;
g) receiving the audio stream into a lighting controller;
h) generating a lighting control signal based upon the received audio stream;
i) transmitting a motion control instruction based upon one of the received audio stream and the lighting control signal to the one or more vibration actuators; and
j) illuminating the portion of the sensory dance floor based upon the lighting control signal.

3. The method of claim 2 additionally comprising the step of isolating at least of portion of the non-auditory stimulation generated through the sensory dance floor from a building in which the sensory dance floor is located.

4. The method of claim 2 wherein the step of transmitting the vibration actuator control signal to the one or more vibration actuators is accomplished via a hardwire conduit.

5. The method of claim 2 additionally comprising, the step of determining a characterization of dancers on the dance floor and transmitting the vibration actuator control signal to the one or more vibration actuators via a wireless transmitter further based upon one of: the characterization of the dancers on the dance floor and detection on the sensory dance floor of a burden between 250 and 500 pounds per square foot of weight.

6. The method of claim 2 wherein the step of transmitting the lighting control signal to the one or more light sources is accomplished via a hardwire conduit.

7. The method of claim 2 wherein the step of transmitting the lighting control signal to the one or more light sources is accomplished via a wireless transmitter.

8. The method of claim 2 additionally comprising the step of synchronizing a lighting control signal with music received via the audio stream.

9. The method of claim 8 wherein the non-auditory stimulation includes human sensory perception other than stimulation perceived by the auditory sense organ.

10. The method of claim 8 wherein the non-auditory stimulation through the sensory dance floor comprises motion of at least a portion of the sensory dance floor.

11. The method of claim 8 additionally comprising the step of controlling one or both of the lighting control signal and the vibration actuator control signal via a mixer device.

12. The method of claim 8 wherein the controller comprises a processor and a memory, said memory storing multiple sensory sequences and the method further comprises the step of selecting a sensory sequence by a disc jockey to be transmitted to the vibration actuators.

13. The method of claim 12 wherein the controller additionally comprises audio controllers and the method additionally comprises the step of transmitting an audio signal to speakers simultaneous to transmitting the vibration actuator control signal to the one or more vibration actuators.

14. The method of claim 13 additionally comprising the step of transmitting an audio signal to speakers simultaneous to transmitting the lighting control signal to the one or more sources.

15. The method of claim 14 wherein the sensory dance floor comprises a dance floor with individually controllable segments.

16. The method of claim 15 wherein the individually controllable segments comprise a grid.

17. The method of claim 15 wherein the individually controllable segments comprise concentric circles.

18. The method of claim 1, wherein the audio component comprises a signal having a frequency less than 20 Hz.

19. The method of claim 1, wherein the audio component comprises a drumbeat having a frequency around 1 Hz, and the method further comprises the step of generating through the sensory dance floor a light pattern or vibration pattern alternating at a frequency around 1 Hz.

20. The method of claim 1, further comprising
k) receiving the music in the audio stream into a lighting controller;
l) generating a lighting control signal based upon the received audio stream;
m) transmitting the lighting control signal to the one or more vibration actuators;
n) illuminating portions of the sensory dance floor based upon the lighting control signal;
o) issuing to each of a plurality of customers a controllable device, wherein each controllable device is connected to a system controller via a wireless connection;
p) pairing at least a first controllable device with a first smart device of a first customer, wherein the pairing grants access to a measurement output of one or more of an accelerometer, microphone, temperature sensor, a biometric sensor or a location sensor of the first smart device;
q) monitoring with the system controller a parameter of the first customer with one or more of the controllable device and the first smart device wherein the parameter comprises one or more of a heartbeat of the customer, a skin temperature of the customer, a sweat level or skin resistivity of the customer or a level of motion of the customer;
r) inferring a condition or emotion of the first customer based upon the parameter monitored by processing the data value of the parameter with an algorithm running on the system controller;
s) displaying at least the first customer on a display screen in a venue of the sensory dance floor;
t) supplementing the non-auditory stimulation of the one or more vibration actuators by a stimulation with one or more of a release of an odor, a mist, or a wind movement based upon the synchronization with the music in the audio stream and upon the inference based upon monitoring of the first customer;
u) deploying a smart mixer board to a DJ;
v) communicating from the system controller one or more characteristics selected from a characterization of the music in the audio stream being played, and a characterization of the plurality of customers;
w) processing the communicated data using an artificial intelligence technique; and
x) outputting a result from the processing of the communicated data to suggest to the DJ additional music in audio streams or other sensory effects to be played.

* * * * *